(12) United States Patent
Gonze et al.

(10) Patent No.: US 8,584,445 B2
(45) Date of Patent: Nov. 19, 2013

(54) METHOD AND SYSTEM FOR CONTROLLING AN ELECTRICALLY HEATED PARTICULATE FILTER

(75) Inventors: Eugene V. Gonze, Pinckney, MI (US); Michael J. Paratore, Jr., Howell, MI (US); Garima Bhatia, Bangalore (IN)

(73) Assignee: GM Global Technology Operations LLC

( * ) Notice: Subject to any disclaimer, the term of this patent is extended or adjusted under 35 U.S.C. 154(b) by 834 days.

(21) Appl. No.: 12/365,415

(22) Filed: Feb. 4, 2009

(65) Prior Publication Data

US 2010/0192549 A1    Aug. 5, 2010

(51) Int. Cl.
*F01N 3/00*    (2006.01)

(52) U.S. Cl.
USPC .......... 60/295; 60/274; 60/285; 60/286; 60/297; 60/300; 60/303; 60/311

(58) Field of Classification Search
USPC .......... 60/274, 276, 285, 286, 295, 297, 300, 60/303, 311
See application file for complete search history.

(56) References Cited

U.S. PATENT DOCUMENTS

| | | | |
|---|---|---|---|
| 4,404,795 A | 9/1983 | Oishi et al. | |
| 4,404,796 A | 9/1983 | Wade | |
| 4,427,418 A | 1/1984 | Kogiso et al. | |
| 4,516,993 A | 5/1985 | Takeuchi et al. | |
| 4,549,395 A | 10/1985 | Dammann | |
| 4,549,398 A | 10/1985 | Oishi et al. | |
| 4,685,290 A | 8/1987 | Kamiya et al. | |
| 5,144,798 A | 9/1992 | Kojima et al. | |
| 5,171,335 A | 12/1992 | Kojima et al. | |
| 5,195,316 A | 3/1993 | Shinzawa et al. | |
| 5,207,807 A | 5/1993 | Manfre et al. | |
| 5,458,673 A | 10/1995 | Kojima et al. | |
| 5,472,462 A | 12/1995 | Pischinger et al. | |
| 5,616,835 A | 4/1997 | Schnaibel et al. | |
| 5,711,149 A | 1/1998 | Araki | |
| 5,716,586 A | 2/1998 | Taniguchi | |
| 5,732,550 A | 3/1998 | Muramatsu et al. | |
| 5,839,279 A | 11/1998 | Moriya et al. | |
| 6,013,118 A | 1/2000 | Matsunuma et al. | |
| 6,050,086 A | 4/2000 | Ishizuka et al. | |
| 6,090,172 A | 7/2000 | Dementhon et al. | |
| 6,167,696 B1 * | 1/2001 | Maaseidvaag et al. | 60/274 |

(Continued)

FOREIGN PATENT DOCUMENTS

| | | |
|---|---|---|
| CN | 1535351 | 10/2004 |
| CN | 1540143 | 10/2004 |

(Continued)

OTHER PUBLICATIONS

German Office Action, dated Jun. 27, 2011, from German Patent Office, for Application No. 102009006446.7, 6 pages.

*Primary Examiner* — Thomas Denion
*Assistant Examiner* — Diem Tran (57) ABSTRACT

A method and system for controlling a diesel particulate filter includes a particulate matter load determination module determining a particulate matter load in a diesel particulate filter (DPF), a desired oxygen level determination module determining a desired exhaust gas oxygen level based on the particulate matter load, an oxygen comparison module comparing the desired exhaust gas oxygen level and a measured exhaust gas oxygen level and generating a comparison signal and an electric DPF control module controlling an electrically heated catalyst in response to the comparison signal.

20 Claims, 6 Drawing Sheets

(56) References Cited

U.S. PATENT DOCUMENTS

| | | | |
|---|---|---|---|
| 6,176,896 B1 | 1/2001 | Dementhon et al. | |
| 6,405,528 B1 | 6/2002 | Christen et al. | |
| 6,634,170 B2 * | 10/2003 | Hiranuma et al. | 60/295 |
| 6,769,246 B2 | 8/2004 | Strohmaier et al. | |
| 6,781,098 B2 | 8/2004 | Toyoda | |
| 6,973,778 B2 | 12/2005 | Kondou et al. | |
| 7,062,904 B1 | 6/2006 | Hu et al. | |
| 7,073,326 B2 | 7/2006 | Cheong | |
| 7,111,455 B2 * | 9/2006 | Okugawa et al. | 60/295 |
| 7,146,804 B2 * | 12/2006 | Yahata et al. | 60/295 |
| 7,171,801 B2 | 2/2007 | Verkiel et al. | |
| 7,288,137 B2 | 10/2007 | Iyer et al. | |
| 7,340,887 B2 | 3/2008 | Ante et al. | |
| 7,412,822 B2 * | 8/2008 | Zhan et al. | 60/295 |
| 7,607,295 B2 | 10/2009 | Yokoyama et al. | |
| 7,615,725 B2 | 11/2009 | Kosaka et al. | |
| 7,631,493 B2 * | 12/2009 | Shirakawa et al. | 60/297 |
| 7,685,811 B2 | 3/2010 | Taylor et al. | |
| 7,794,528 B2 | 9/2010 | Tochikawa et al. | |
| 7,886,529 B2 | 2/2011 | Gonze et al. | |
| 7,896,956 B2 | 3/2011 | Takase et al. | |
| 7,901,475 B2 | 3/2011 | Gonze et al. | |
| 8,037,673 B2 | 10/2011 | Gonze et al. | |
| 8,146,350 B2 | 4/2012 | Bhatia et al. | |
| 8,292,987 B2 | 10/2012 | Gonze et al. | |
| 2003/0000188 A1 | 1/2003 | Harada et al. | |
| 2003/0113249 A1 * | 6/2003 | Hepburn et al. | 423/242.1 |
| 2003/0131592 A1 | 7/2003 | Saito et al. | |
| 2004/0134187 A1 | 7/2004 | Inoue et al. | |
| 2004/0194450 A1 | 10/2004 | Tanaka et al. | |
| 2005/0072141 A1 | 4/2005 | Kitahara | |
| 2005/0198944 A1 | 9/2005 | Saitoh et al. | |
| 2006/0075731 A1 | 4/2006 | Ohno et al. | |
| 2006/0254265 A1 | 11/2006 | Odajima et al. | |
| 2007/0062181 A1 | 3/2007 | Williamson et al. | |
| 2007/0137186 A1 | 6/2007 | Igarashi | |
| 2007/0214778 A1 | 9/2007 | Narita et al. | |
| 2007/0220869 A1 | 9/2007 | Gonze et al. | |
| 2007/0220870 A1 | 9/2007 | Gonze et al. | |
| 2007/0227104 A1 | 10/2007 | Gonze et al. | |
| 2007/0245721 A1 | 10/2007 | Colignon | |
| 2008/0041035 A1 | 2/2008 | Sawada et al. | |
| 2008/0083212 A1 | 4/2008 | Ament et al. | |
| 2008/0295483 A1 | 12/2008 | Scaife et al. | |
| 2009/0064664 A1 | 3/2009 | Hirata et al. | |
| 2009/0071128 A1 | 3/2009 | Gonze et al. | |
| 2009/0113883 A1 | 5/2009 | Bhatia et al. | |
| 2009/0158715 A1 | 6/2009 | Stroh et al. | |
| 2009/0183501 A1 | 7/2009 | Gonze et al. | |
| 2009/0288398 A1 | 11/2009 | Perfetto et al. | |
| 2010/0095657 A1 | 4/2010 | Gonze et al. | |
| 2010/0126145 A1 | 5/2010 | He et al. | |

FOREIGN PATENT DOCUMENTS

| | | |
|---|---|---|
| CN | 101091038 A | 12/2007 |
| CN | 101429884 A | 5/2009 |
| CN | 101446222 | 6/2009 |
| DE | 10200846924 A1 | 4/2009 |
| DE | 102008046706 A1 | 4/2009 |
| DE | 102008050169 A1 | 5/2009 |
| GB | 2454341 A | 6/2009 |
| JP | 06-221138 * | 8/1994 |
| JP | 2000-297625 | 10/2000 |

* cited by examiner

METHOD AND SYSTEM FOR CONTROLLING AN ELECTRICALLY HEATED PARTICULATE FILTER

FIELD

The present disclosure relates to vehicle exhaust systems, and more particularly to controlling an electrically heated particulate filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

An exhaust treatment system is typically used to reduce vehicle emissions. A control module monitors engine operation and a dosing system selectively injects urea into the exhaust upstream from a catalyst. The treated exhaust reacts with the catalyst. A chemical reaction occurs that heats the catalyst and reduces emissions in the exhaust. More specifically, the chemical reaction decomposes the $NO_x$ and urea into separate elements. $NO_x$ decomposes into nitrogen and water. The urea decomposes into ammonia, which is stored on the surface of the catalyst.

A diesel particulate filter is also used in the exhaust system for diesel engines. The diesel particulate filter removes particulate matter from the exhaust gases. The particulate matter is often referred to as soot. A diesel-powered vehicle equipped with a functioning filter will emit no visible smoke from its exhaust pipe.

In addition to collecting the particulate matter, a method for cleaning the filter must exist. Some filters are disposable and must be removed. Other filters are designed to oxidize the accumulated particulate matter. One way to clean the filter is to operate the engine in a pre-determined way so that the exhaust gas temperatures are heated to a level above the soot combustion temperature. This is known as filter regeneration.

The diesel particulate filter is sensitive to overheating. If a diesel particulate filter is overheated, cracking or other damage to the particulate filter may occur.

SUMMARY

Accordingly, the present disclosure provides a method and system for controlling the diesel particulate filter by controlling the oxygen levels of the exhaust gases as well as controlling an electrically heated element within the diesel particulate filter.

In one aspect of the disclosure, a method includes a particulate matter load determination module determining a particulate matter load in a diesel particulate filter, a desired oxygen level determination module determining a desired exhaust gas oxygen level based on the particulate matter load, an oxygen comparison module comparing the desired exhaust gas oxygen level and a measured exhaust gas oxygen level and generating a comparison signal and an electric DPF control module controlling an electrically heated catalyst in response to the comparison signal.

In another aspect of the disclosure, a control system includes a particulate matter load determination module determining a particulate matter load in a diesel particulate filter, a desired oxygen level determination module determining a desired exhaust gas oxygen level based on the particulate matter load, an oxygen comparison module comparing the desired exhaust gas oxygen level and a measured exhaust gas oxygen level and generating a comparison signal and an electric DPF control module controlling an electrically heated catalyst in response to the comparison signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

The present disclosure is set forth using a diesel engine. However, the present disclosure may be used for other types of engines such as gasoline engines.

Figure 1:
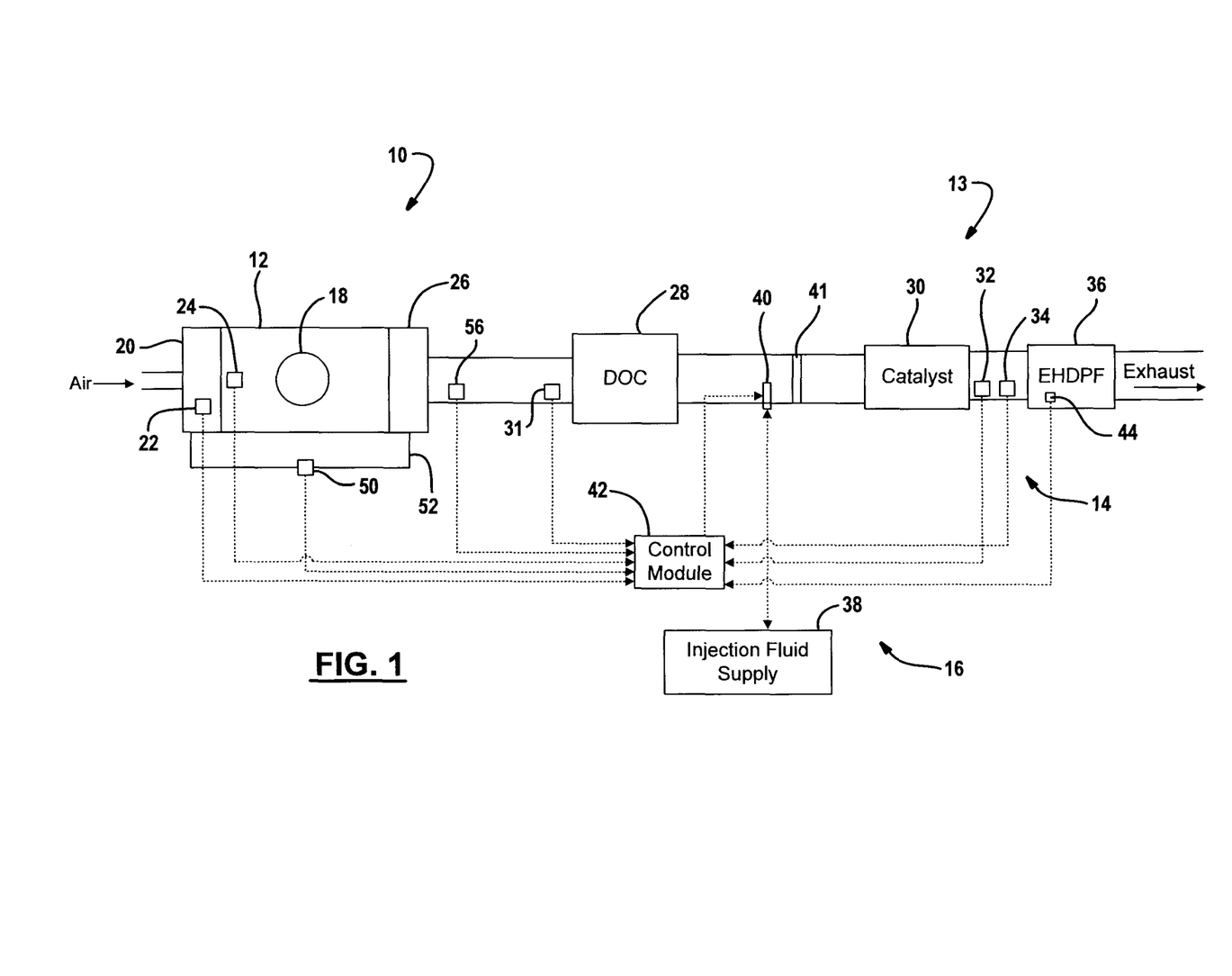
FIG. 1 is a functional block diagram of an engine system including an exhaust treatment system with temperature sensors integrated within a catalyst according to the present disclosure.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, preferably a selective catalyst reducing (SCR) catalyst, a temperature sensor 31, a temperature sensor 32, an oxygen sensor 34 and an electrically heated catalyzed diesel particulate filter (EHDPF) 36. The DOC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 18. The temperature sensor 32 after the catalyst 30 to monitor the temperature change at the outlet of the catalyst 30. The oxygen sensor 34 is located after the catalyst to monitor the oxygen level at the outlet of the catalyst 30 prior to the EHDPF 36, as discussed further below. The CDPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A control module 42 regulates operation of the engine system 10 and monitors operation of the dosing system 16. The control module 42 receives temperature signals from the temperature sensors 31 and 32. The control module 42 further monitors operation of the exhaust treatment system 13 based on the change in temperature at the inlet and outlet of the catalyst 30.

The electrically heated diesel particulate filter 36 may include a heater 44 located therein. The heater 44 may have various locations and configurations including extending radially across the EHDPF 36. The control module 42 controls the operation of the EHDPF as will be described below.

An exhaust gas recirculation valve 50 may also be controlled by the control module 42. The exhaust gas recirculation valve 50 is disposed within a conduit 52 that communicates exhaust gases from the exhaust system or exhaust gas manifold 26 into the intake manifold 20. By controlling the opening and closing of the valve 50, the amount of exhaust gases recirculated from the exhaust into the intake is known. Controlling the exhaust gas recirculation changes the amount of oxygen in the exhaust gases.

An oxygen sensor 56 is also in communication with a control module 42. The oxygen sensor 56 generates a signal corresponding to the oxygen level within the exhaust gases. Based upon the oxygen level, the air fuel ratio of the engine may be known. One suitable type of sensor is a lambda sensor that switches in response to the oxygen level of the vehicle. The switching response corresponds directly to the air fuel ratio of the vehicle. Of course other types of air fuel ratio sensors may replace oxygen sensor 56.

Figure 2:
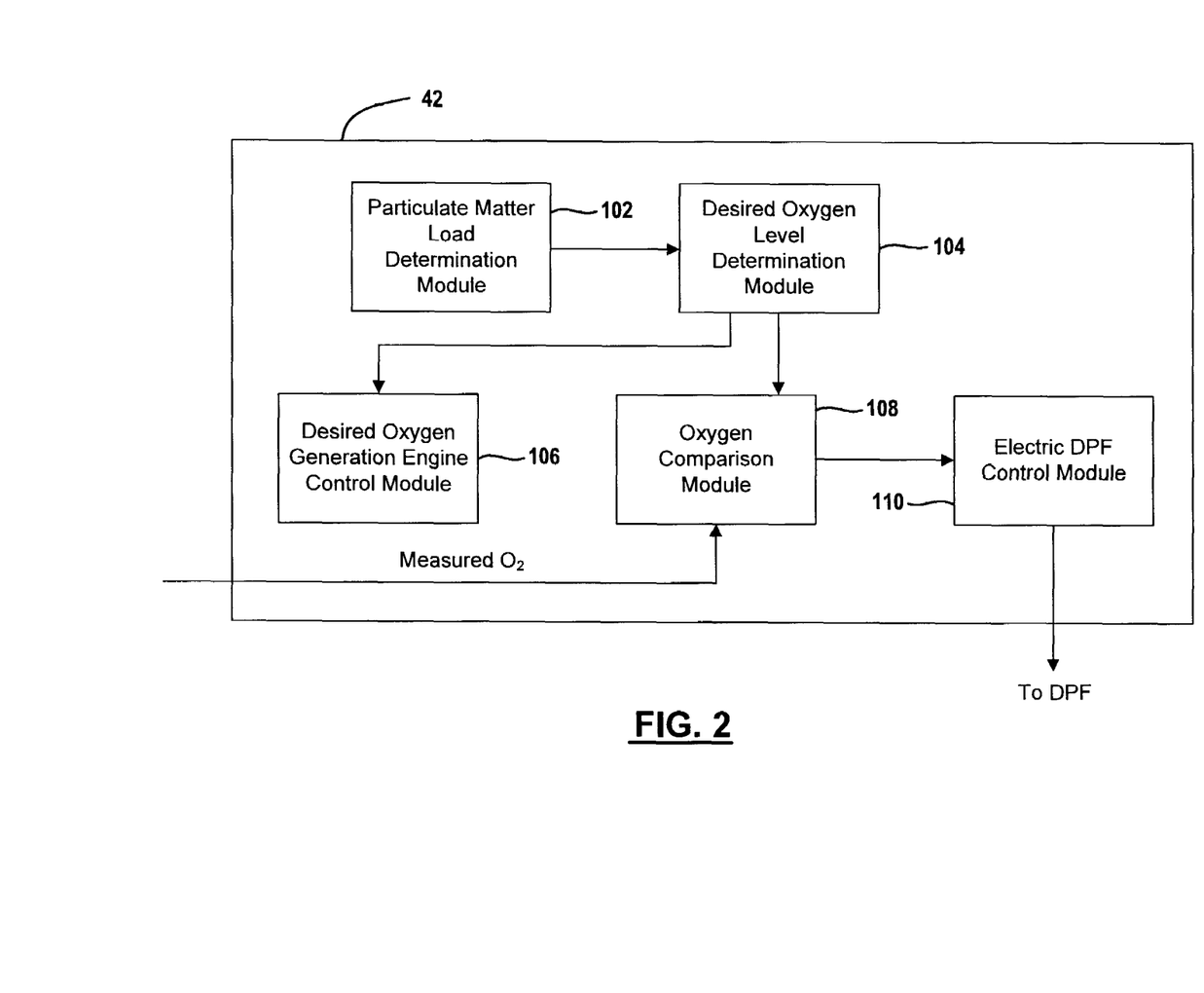
FIG. 2 is a functional block diagram of the controller of FIG. 1.

Referring now to FIG. 2, the control module 42 of FIG. 1 is illustrated in further detail. A particulate matter load determination module 102 generates a particulate matter load signal corresponding to the amount of particulate matter or soot within the diesel particulate filter. The particulate matter load may be determined in various ways including monitoring the outputs of various sensors including monitoring the time since the last regeneration of the diesel particulate filter.

A desired oxygen level determination module 104 generates a desired oxygen level desired in the exhaust gases to generate oxidation levels suitable for removing the particulate matter or soot from the diesel particulate filter. The desired oxygen level corresponds to a level that may be the lowest effective value where regeneration still removes all of the soot or particulate matter from the diesel particulate filter while maximizing the substrate durability and fuel efficiency of the vehicle. As will be described below, the particulate matter loading density is determined and then the oxygen level will be provided to limit the peak temperatures for the vehicle's exhaust conditions.

The desired oxygen level determination module 104 generates a desired oxygen level signal and communicates a desired oxygen level signal to a desired oxygen generation engine control module 106. The desired oxygen generation engine control module 106 may be part of a general engine control scheme. The desired oxygen generation engine control module 106 controls various parameters of the engine to achieve the desired oxygen level. Such parameters include changing the air fuel ratio of the engine, the exhaust gas recirculation of the engine and controlling the urea injection or dosing system 16.

An oxygen comparison module 108 compares a measured oxygen level in the exhaust gases to the desired oxygen level from the desired oxygen level determination module 104 and generates a comparison signal. When the desired oxygen level is not achieved by engine control alone, the electrically controlled diesel particulate filter heater may be controlled by the electric diesel particulate filter control module 110 in response to the comparison signal. The heater within the electric diesel particulate filter control module 110 controls the heater 44 within the EHDPF 36. By electrically controlling the heating element of the diesel particulate filter, the proper oxidation temperature for particulate matter oxidation may be reached.

The heater may be controlled in zones. That is, only a portion of the cross-sectional area of the EHDPF may undergo soot removal. Also, the temperatures used may be lower temperatures. This may allow the upstream most portion of the EHDPF to undergo soot removal. Because of the channels in the EHDPF the initiation of soot removal at the beginning of the channel may cause the remaining soot to be removed. The soot will burn downstream in a fuse-like manner until the end of the channel is reached. This may be achieved at lower flow rates and thus lower temperature while still providing for soot or particulate removal.

Figure 3:
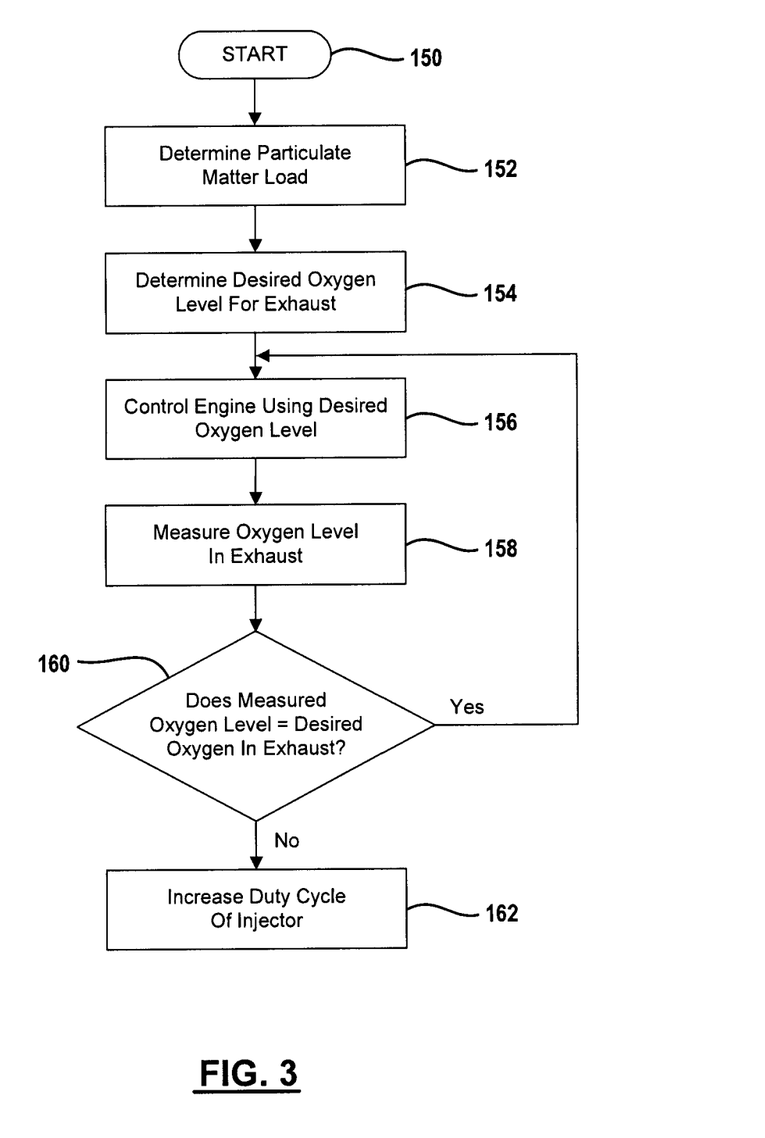
FIG. 3 is a flowchart illustrating steps executed by the system of present disclosure.

Referring now to FIG. 3, a method of controlling diesel particulate filter (DPF) regeneration is set forth. In step 150, the system starts a DPF oxygen control. In step 152, the particulate matter load within the diesel particulate filter is determined. As mentioned above, various parameters and operating conditions of the vehicle contribute to the amount of particulate matter within the diesel particulate filter. Over time, the particulate matter builds up on the diesel particulate filter. In step 154, the desired oxygen level for the exhaust to oxidize the particulate matter is determined based upon the particulate matter load determined in step 152 and the desired maximum temperature for the regeneration. The maximum temperature may also correspond to the particulate matter load within the diesel particulate filter.

In step 156, the engine is controlled using the desired oxygen level determined in step 154. Various functions alone or in combination may be used to control the desired oxygen level including, but not limited to, changing the air fuel ratio, changing the amount of exhaust gas recirculation and changing the amount of urea injected by the dosing system 16.

In step 158, the oxygen level in the exhaust is measured. This may be measured directly by an oxygen sensor. In step 160, the measured oxygen level and the desired oxygen level are compared. In certain situations, the desired oxygen level may not be high enough for the diesel particulate filter to perform oxidation to remove all or substantially all of the particulate matter or soot within the diesel particulate filter. When the oxygen level alone cannot raise the diesel particulate filter temperature in step 160, the electrical heater within the diesel particulate filter is controlled 166 to raise the temperature of the diesel particulate filter.

Figure 4A:
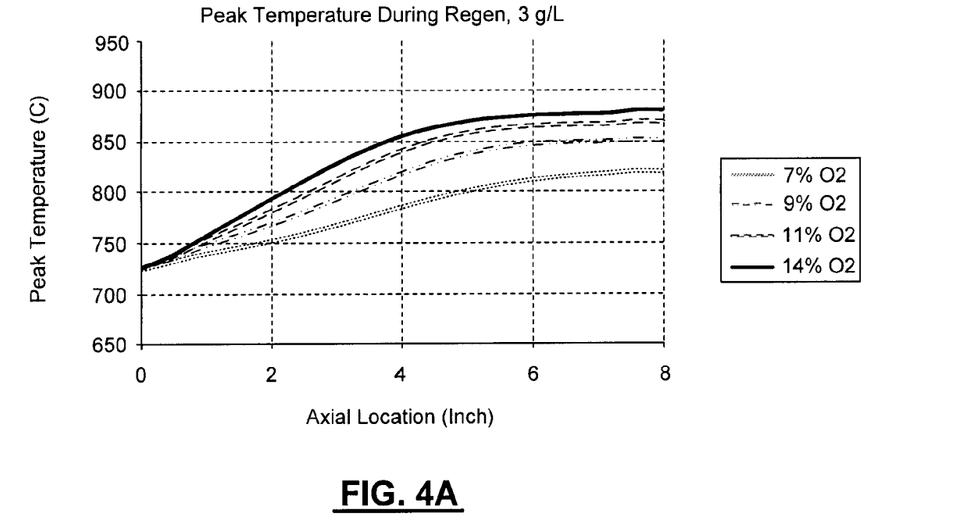
FIG. 4A is a plot of peak temperature versus axial location for a first particulate matter loading.

Referring now to FIG. 4A, a peak temperature versus axial location within the particulate filter during regeneration is set forth for a three-gram-per-liter particulate matter loading. Various levels of peak temperatures are attained with various oxygen levels as is set forth. A 7% oxygen level, 9% oxygen level, an 11% oxygen level and a 14% oxygen level are illustrated.

Figure 4B:
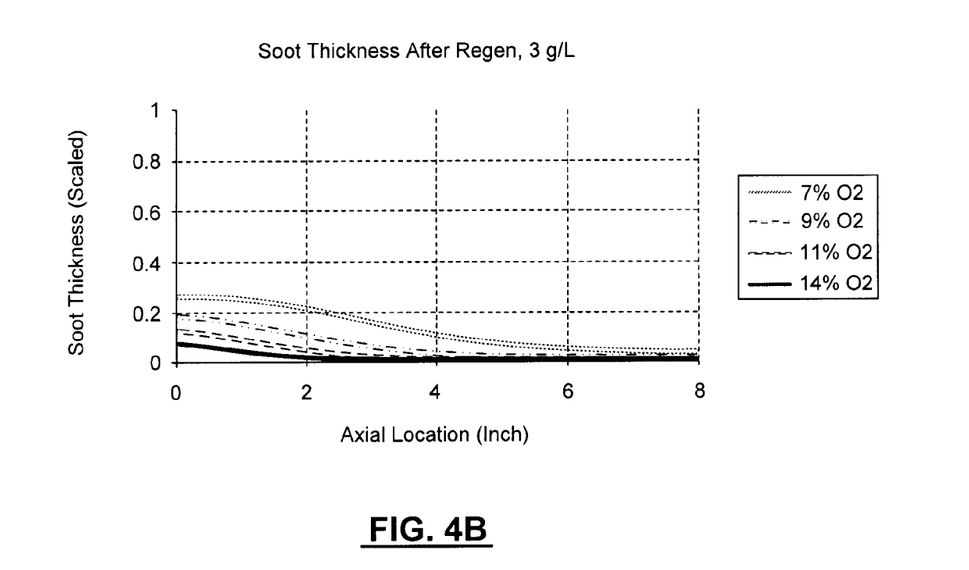
FIG. 4B is a plot of soot thickness versus axial location after regeneration for the first particulate matter loading.
Figure 5A:
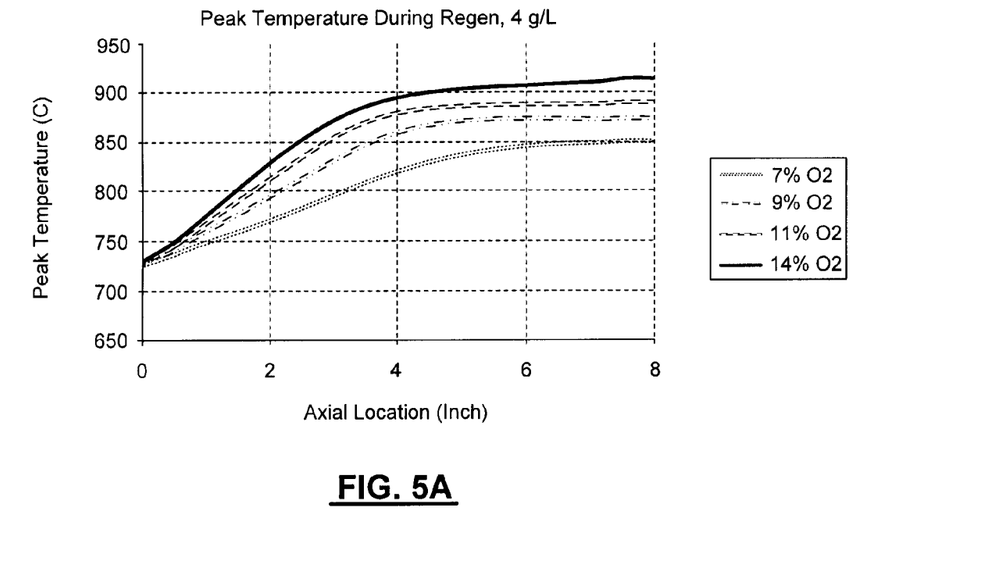
FIG. 5A is a plot of peak temperature versus axial location for a second particulate matter loading.
Figure 5B:
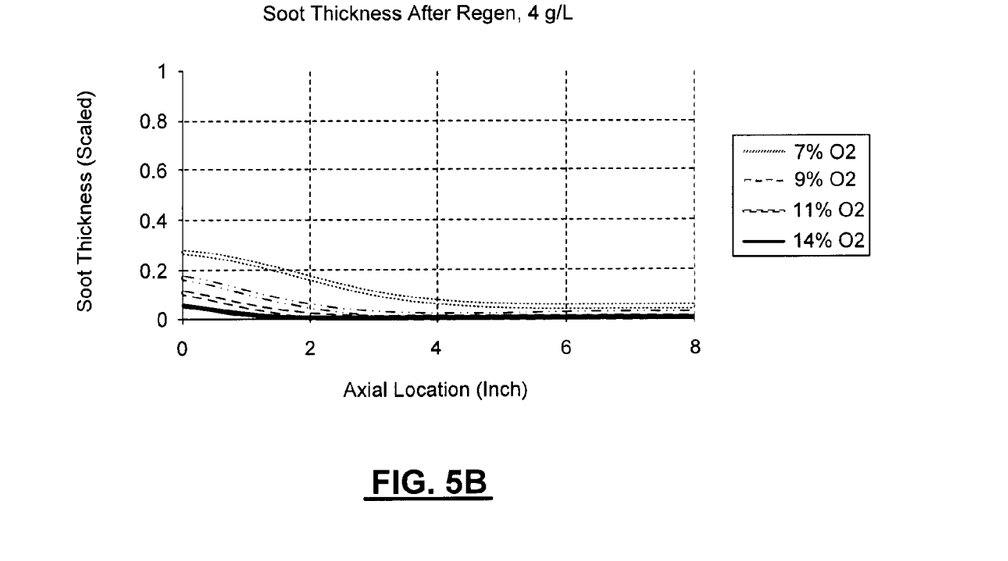
FIG. 5B is a plot of soot thickness versus axial location after regeneration for the second particulate matter loading.
Figure 6A:
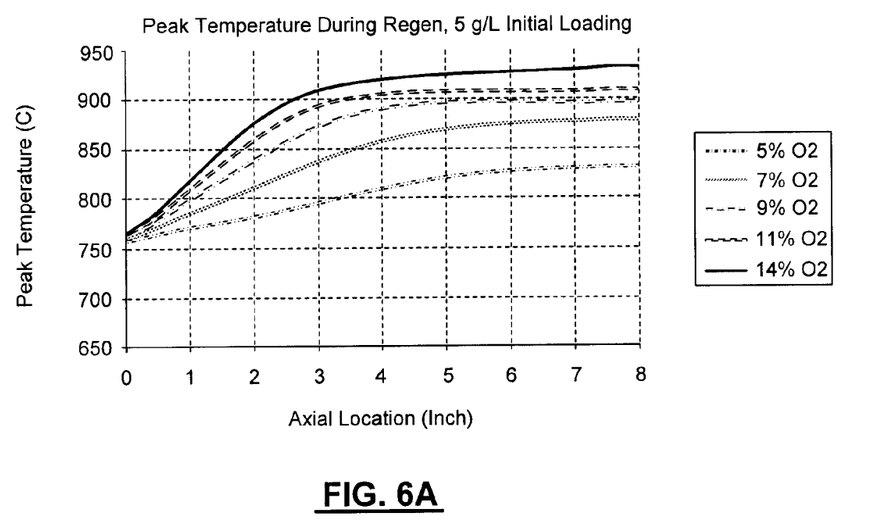
FIG. 6A is a plot of peak temperature versus axial location for a third particulate matter loading.
Figure 6B:
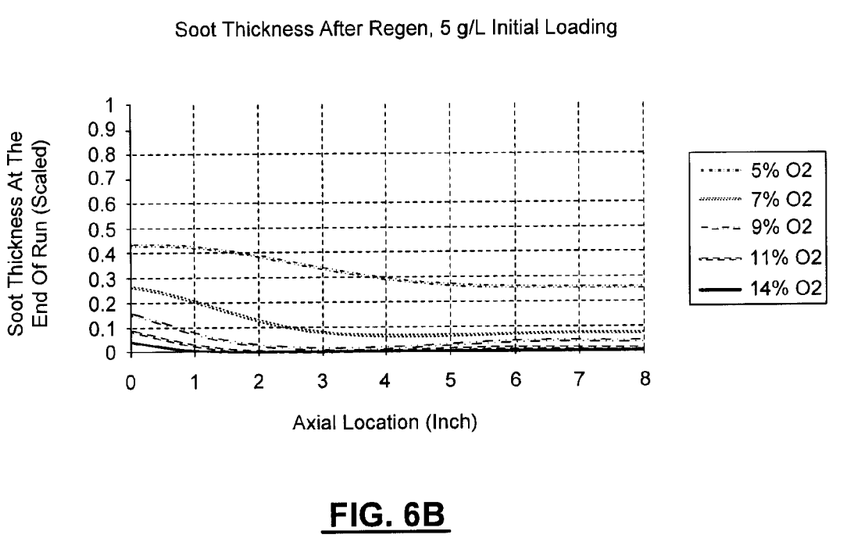
FIG. 6B is a plot of soot thickness versus axial location after regeneration for the third particulate matter loading.

Referring now to step 4B, the soot thickness versus axial location after regeneration is set forth for various oxygen levels.

Referring now to FIGS. 5A-6B, peak temperatures and soot thicknesses are illustrated for four-grams-per-liter particulate matter load and five-grams-per-liter particulate matter load, each at various oxygen levels. From these graphs, the particulate matter loading density may be determined and the oxygen level that will limit the peak temperatures for the vehicle's present exhaust conditions may be controlled. This will increase the substrate durability and reduce the tailpipe temperature.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A control system comprising:
a particulate matter load determination module determining a particulate matter load in a diesel particulate filter;
a desired oxygen level determination module determining a desired exhaust gas oxygen level based on the particulate matter load;
an oxygen comparison module comparing the desired exhaust gas oxygen level and a measured exhaust gas oxygen level and generating a comparison signal; and
an electric DPF control module controlling an electrically heated catalyst in response to the comparison signal.

2. A control system as recited in claim 1 wherein the electrically heated catalyst comprises an electrically heated diesel particulate filter.

3. A control system as recited in claim 1 wherein the desired oxygen level determination module determines the desired exhaust gas oxygen level based on the particulate matter load and a maximum desired catalyst temperature.

4. A control system as recited in claim 3 wherein the maximum desired temperature corresponds to a lowest diesel particulate filter temperature for removing soot from the diesel particulate filter.

5. A control system as recited in claim 3 wherein the maximum desired temperature corresponds to a lowest diesel particulate filter temperature for removing soot from the diesel particulate filter a predetermined axial direction into the diesel particulate filter.

6. A control system as recited in claim 1 further comprising an engine control module controlling the exhaust gas oxygen level.

7. A control system as recited in claim 6 wherein the engine control module controls the exhaust gas oxygen level by controlling at least one of air fuel ratio, exhaust gas recirculation and a post exhaust injector.

8. A control system as recited in claim 6 wherein the engine control module controls the exhaust gas oxygen level by controlling at least two of air fuel ratio, exhaust gas recirculation and a post exhaust injector.

9. A control system as recited in claim 1 further comprising a diesel engine.

10. A control system as recited in claim 9 wherein the diesel engine generates an exhaust stream and further comprising an oxygen sensor sensing the exhaust oxygen level.

11. A method comprising:
determining a particulate matter load in a diesel particulate filter;
determining a desired exhaust gas oxygen level based on the particulate matter load;
measuring an exhaust gas oxygen level to form a measured exhaust gas oxygen level;
comparing the desired exhaust gas oxygen level and the measured exhaust gas oxygen level; and
controlling an electrically heated catalyst in response to comparing.

12. A method as recited in claim 11 further comprising controlling the exhaust gas oxygen level.

13. A method as recited in claim 11 wherein controlling an electrically heated catalyst comprises electrically heating the diesel particulate filter.

14. A method as recited in claim 11 wherein determining a particulate matter load in a diesel particulate filter comprises determining the particulate matter load in the diesel particulate filter in an exhaust stream of a diesel engine.

15. A method as recited in claim 11 wherein determining a desired exhaust oxygen level comprises determining the desired exhaust gas oxygen level based on the particulate matter load and a maximum desired catalyst temperature.

16. A method as recited in claim 15 wherein the maximum desired temperature corresponds to a lowest diesel particulate filter temperature for removing soot from the diesel particulate filter.

17. A method as recited in claim 15 wherein the maximum desired temperature corresponds to a lowest diesel particulate filter temperature for removing soot from the diesel particulate filter a predetermined axial direction into the diesel particulate filter.

18. A method as recited in claim 12 wherein controlling the exhaust gas oxygen level comprises controlling at least one of air fuel ratio, exhaust gas recirculation and a post exhaust injector.

19. A method as recited in claim 18 wherein controlling the post exhaust injector comprises injecting urea through an injector.

20. A method as recited in claim 12 wherein controlling the exhaust gas oxygen level comprises controlling at least two of air fuel ratio, exhaust gas recirculation and a post exhaust injector.

* * * * *